Aug. 24, 1965   H. J. FINDLEY   3,202,024
PATTERN CONTROLLED TOOL
Filed March 16, 1961   8 Sheets-Sheet 1

FIG.1

INVENTOR.
HOWARD J. FINDLEY
BY Hudson, Boughton,
Williams, David & Hoffman
ATTORNEYS Aug. 24, 1965 H. J. FINDLEY 3,202,024
PATTERN CONTROLLED TOOL
Filed March 16, 1961 8 Sheets-Sheet 2

FIG.2

INVENTOR.
HOWARD J. FINDLEY
BY Hudson, Boughton
Williams, David & Hoffmann
ATTORNEYS Aug. 24, 1965   H. J. FINDLEY   3,202,024
PATTERN CONTROLLED TOOL
Filed March 16, 1961   8 Sheets-Sheet 3

FIG. 3

INVENTOR.
HOWARD J. FINDLEY
BY Hudson, Boughton,
Williams, David & Hoffmann
ATTORNEYS Aug. 24, 1965

H. J. FINDLEY 3,202,024

PATTERN CONTROLLED TOOL

Filed March 16, 1961

INVENTOR.
HOWARD J. FINDLEY
BY Hudson Boughton,
Williams, David & Hoffmann
ATTORNEYS Aug. 24, 1965  H. J. FINDLEY  3,202,024
PATTERN CONTROLLED TOOL
Filed March 16, 1961  8 Sheets-Sheet 6

INVENTOR.
HOWARD J. FINDLEY
BY Hudson, Creighton,
Williams, David & Hoffmann
ATTORNEYS

INVENTOR.
HOWARD J. FINDLEY
ATTORNEYS

Aug. 24, 1965 H. J. FINDLEY 3,202,024
PATTERN CONTROLLED TOOL
Filed March 16, 1961 8 Sheets-Sheet 8

FIG. 11

INVENTOR.
HOWARD J. FINDLEY
BY Hudson, Boughton,
Williams, David & Hoffmann
ATTORNEYS

United States Patent Office 3,202,024
Patented Aug. 24, 1965

3,202,024
PATTERN CONTROLLED TOOL
Howard J. Findley, Lyndhurst, Ohio, assignor to Textron Inc., Providence, R.I., a corporation of Rhode Island
Filed Mar. 16, 1961, Ser. No. 96,220
22 Claims. (Cl. 82—14)

This invention is concerned with the formation of a desired interrupted configuration on a workpiece by cutting thereof at spaced locations and, as one of its objects, aims to provide a novel method and apparatus by which such cutting is accomplished in a rapid and efficient manner by a power actuated control movement of a cutting tool into and out of cutting engagement with the workpiece by a movement of the tool toward and away therefrom during a substantially continuous relative traversing movement of the tool over the workpiece, so that the cutting action of the tool on the workpiece along the path of such traversing movement is an interrupted cutting action.

Another object of this invention is to provide a novel method and apparatus for reproducing a desired interrupted configuration on a workpiece by a limited control movement of a cutting tool, relative to its tool mount and in a direction toward and away from the workpiece, by a power output device located in the tool mount and responsive to control signals produced by a reading of a pattern means in synchronism with a substantially continuous relative traversing movement of the tool over the workpiece.

The invention is usable in various kinds of machine tools and machining procedures and provides for rapidly and satisfactorily reproducing on the workpiece a desired configuration such as teeth, splines, letters, numerals, designs or other matter adapted to be represented by a readable pattern means. The method and apparatus are usable, for example, in lathes and planers as disclosed hereinafter in which the workpiece is movable relative to the cutting tool, but the useful application of the invention is not limited to only these two types of machines.

Still another object is to provide novel apparatus of the character above indicated wherein the tool mount has a reaction means thereon and a flexible yoke means connected with said reaction means and supporting the cutting tool for limited control movement toward and away from the workpiece, and wherein the power output means is a power device connected between the yoke and reaction means and responsive to electric control signals, and the pattern reading means is operable to produce such electric control signals by reading of the pattern means in synchronism with the relative movement between the workpiece and tool.

Additionally, this invention provides a novel method and apparatus of the character referred to above wherein the pattern reading means is of a sensing type, as distinguished from a feeler-contact type, and wherein the reading of the pattern means to produce control signals is accomplished independently of any feeler engagement with the pattern means.

Other novel characteristics, objects and advantages of this invention will be apparent in the following detailed description and in the accompanying drawings forming a part of this specification and in which.

Figure 1:
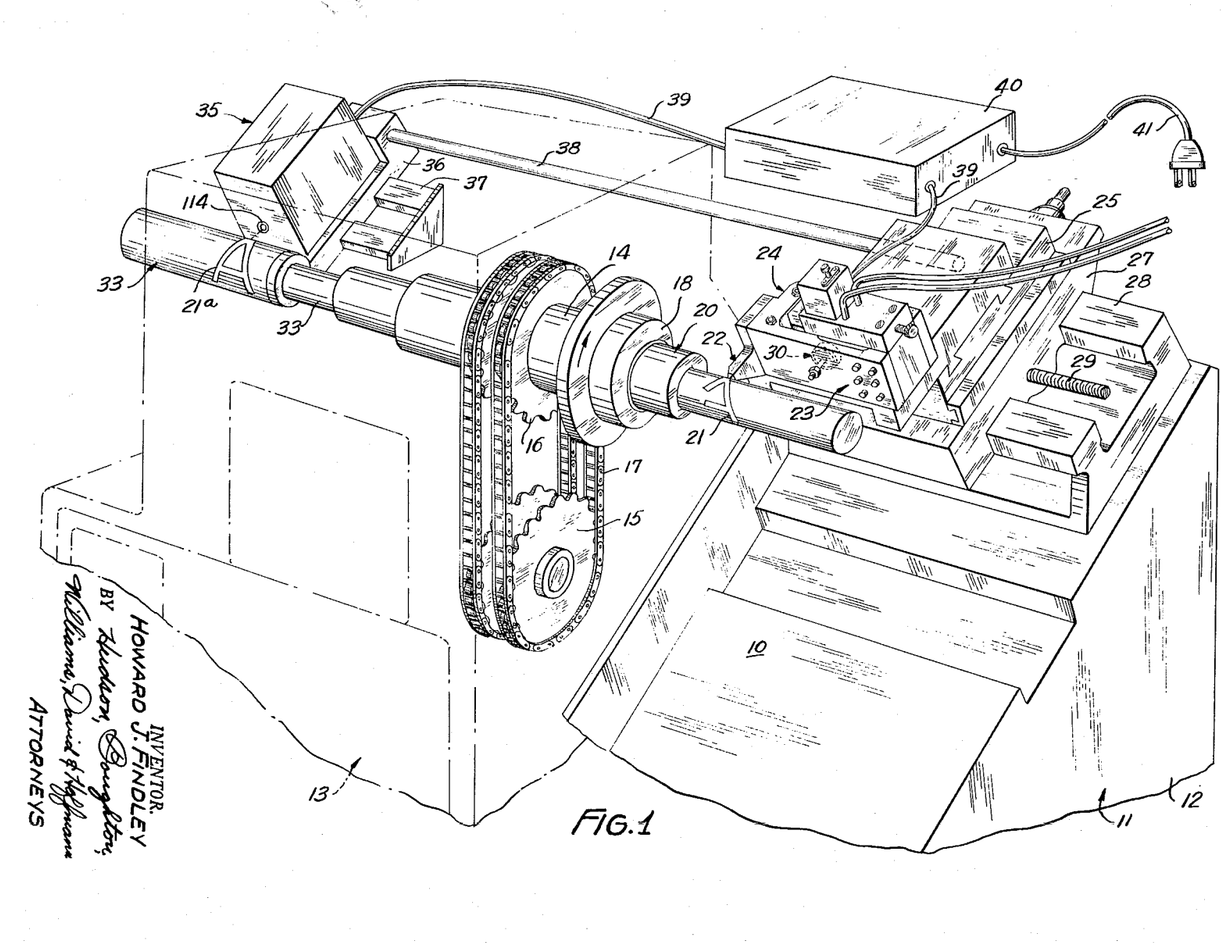
FIG. 1 is a perspective view of a somewhat diagrammatic nature illustrating the method of this invention and one form of machine tool apparatus usable therein and equipped with a photoelectric type of pattern reading means.

As has already been indicated above in a general way, the method of this invention provides for the removal of material from a workpiece at spaced locations by a controlled power-actuated movement of a cutting tool, toward and away therefrom during a substantially continuous relative traversing movement therebetween, whereby an interrupted cutting action of the tool reproduces on the workpiece a desired configuration. Such controlled movement of the cutting tool is in response to control signals supplied thereto and preferably produced by a reading means in a synchronized co-operative relation to a pattern means representative of such desired configuration. FIG. 1 of the drawings shows machine tool apparatus 10 of the lathe type for carrying out this novel method and which apparatus is itself of a novel construction as will appear hereinafter.

The machine 10 is provided with a frame structure 11 which includes a tool mount section 12, and a headstock section 13 adjacent thereto and having rotatable work spindle means 14 suitably mounted therein. The work spindle means 14 is adapted to be rotatably driven as by means of sprockets 15 and 16 and chain means 17 extending therearound. A workholder device 18 of a suitable type is connected with the spindle means 14 to be rotated thereby and is adapted to receive and hold a workpiece 20 on which the desired configuration 21 is to be reproduced by the cutting action of a cutting tool 22 thereon.

The machine 10 also comprises a tool mount 23 for supporting the cutting tool 22 in a co-operative relation to the workpiece 20 and for producing the above-mentioned controlled movement of the tool toward and away from the workpiece. The cutting tool 22 and the tool mount 23 together comprise a tool-holder unit 25. The machine 10 includes a compound slide means 25 of a conventional form on which the toolholder unit 24 is located for movement thereby into the desired co-operative relation to the workpiece 20. The machine 10 also includes a carriage 27 having the compound slide means 25 thereon and which carriage is slidable on ways 28 of the tool mount section 12, as by means of a feed screw 29, for causing a desired longitudinal feed movement of the cutting tool 22 along the workpiece 20.

The tool mount 23 will be further described hereinafter but at this point it should be stated that the mount is constructed with a double-acting power output means 30 therein and that the cutting tool 22 is movable by the power output means in an in-and-out direction toward and away from the workpiece 20 for causing the tool to be intermittently moved into and out of cutting engagement with the workpiece for reproducing the configuration 21 thereon by an interrupted cutting action. The in-and-out movement of the cutting tool 22 just mentioned is likewise a movement in a direction transverse to the relative feed movement between the tool and workpiece, in this case, a movement in a direction transverse to the longitudinal feed movement of the cutting tool along the workpiece.

The machine 10 also comprises a pattern support means 32 which is here shown as being an extension of the work spindle means 14 and is adapted to support a pattern means 33 and to actuate the latter, in this case to rotate the same, in a synchronized relation to the rotation of the workpiece 20. The machine 10 further includes a signal-producing reading means 35 in a co-operative relation to the pattern means 33 for reading the same and producing control signals in accordance with such reading of the pattern means.

The reading means 35 is here shown as supported by a slide 36 which is mounted on ways 37 of the headstock section 13 for a co-operative longitudinal movement of the reading means along the pattern means 33 during the synchronizing rotation of the latter. In the machine 10 the synchronized rotation of the pattern means 33 relative to the rotation of the workpiece 20 is at a one to one ratio but could be at a different ratio if desired. The reading means 35 is actuatable along the pattern means 33 in a synchronized relation to the feeding movement of the cutting tool 22, in this case the above-described longitudinal feed movement of the cutting tool, and such synchronized actuation of the reading means is here shown as produced by thrust transmitted from the carriage 27 to the slide 36 through a thrust transmitting connecting rod means 38. The movement of the reading means 35 as produced by the rod connection 38 is at a one to one ratio with respect to the longitudinal feed movement of the tool 22 but, if desired, a different ratio could be provided.

As will appear in greater detail hereinafter, the power device 30 is an electric-signal-responsive power device and the reading means 35 is an electric-signal-producing reading means operable to produce the electric control signals to which the power device 30 is responsive. The control signals produced by the reading means 35 are transmitted to the power device 30 through conductor cable means 39 extending therebetween and through a signal amplifying and converting unit 40 which will also be further described hereinafter. The unit 40 is adapted to be connected with a suitable source of electric current as by a plug-in conductor cord 41 extending therefrom.

The reading means 35 can be of various types and forms of construction but, as embodied in the machine 10 of FIG. 1, is of the photoelectric type and operates to produce electric control signals in response to a sensing of the pattern means 33 by an optical scanning thereof. The pattern means 33 may comprise a previously completed workpiece, or may be of any other desired form which suitably represents the configuration to be reproduced, such as a sheet or cylinder disposed in an attached and surrounding relation to a rotatable mandrel or the like of the pattern support means 32. The pattern means 33 carries a configuration 21ª comprising various pattern portions representative of the pattern portions to be reproduced on the workpiece 20 to constitute the desired configuration 21 of the latter. The workpiece configuration 21 is an interrupted configuration inasmuch as it is comprised of portions which can be defined on the workpiece 20 only by an interrupted cutting action, that is, by an intermittent cutting engagement of the tool 22 with the workpiece during the relative traversing movement of the tool over the workpiece.

From the general desciption given above of the machine 10 and the components thereof it will be recognized that, during the rotation of the workpiece 20 in co-operation with the cutting tool 22 and the longitudinal feed movement imparted to the tool during such co-operation, the pattern means 33 will be rotated in synchronism with the rotation of the workpiece and the reading means 35 will be moved longitudinally along the pattern means in synchronism with the longitudinal feed movement of the cutting tool. The relative scanning movement thus produced between the reading means 35 and the pattern means 33 will cause a reading of the different pattern portions of the configuration 21ª in succession and in synchronism with the movement of different portions of the workpiece 20 past the cutting tool 22 so that, upon actuation of the tool toward and away from the workpiece by the power output device 30 of the tool mount 23, the cutting tool will be intermittently moved into cutting engagement with the workpiece for varying the cutting action of the tool on different portions thereof for properly reproducing the configuration 21 thereon.

Figure 2:
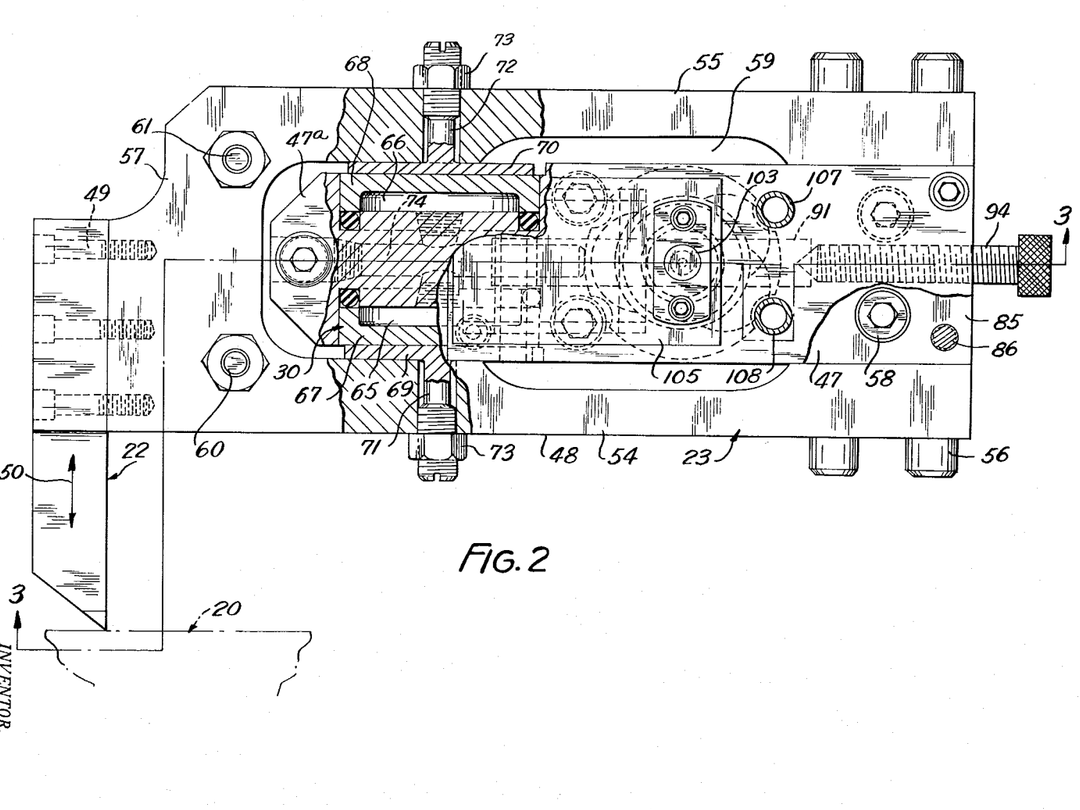
FIG. 2 is a plan view, with portions in section, showing the cutting tool and a portion of the tool mount in a detached relation and on a larger scale.
Figure 3:
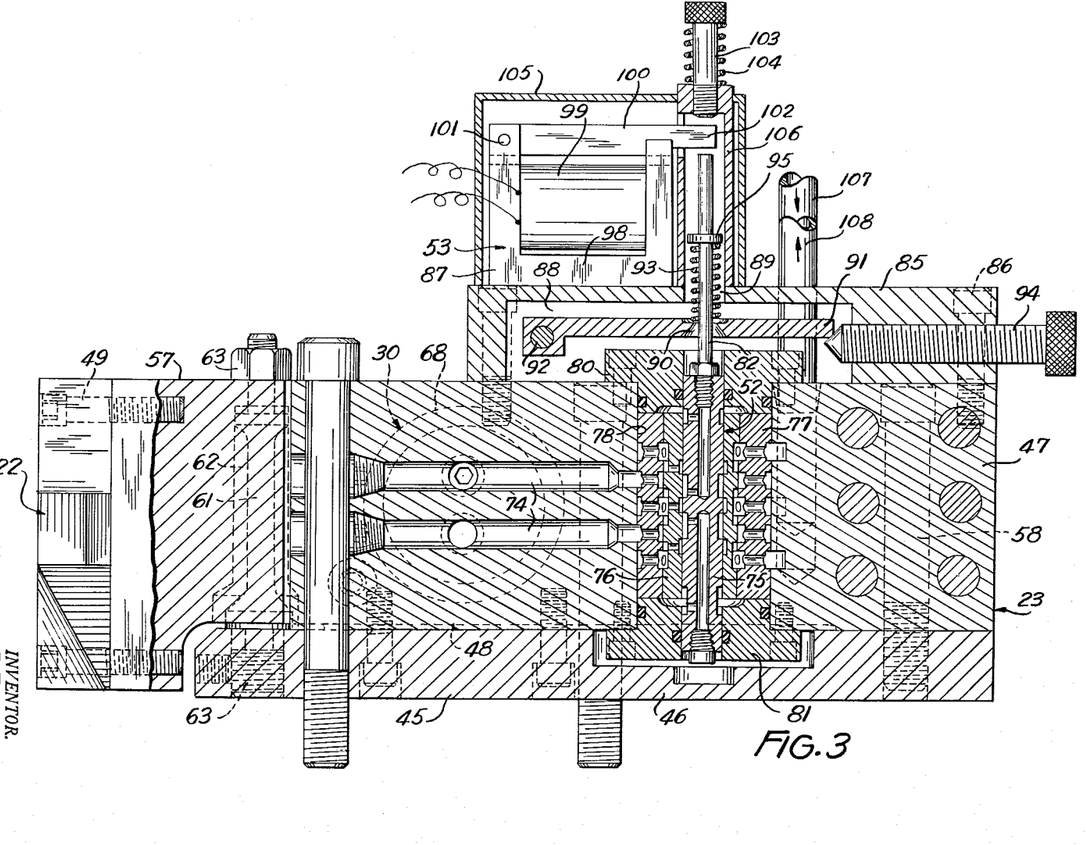
FIG. 3 is a vertical section taken through the tool mount on section line 3—3 of FIG. 2.

The tool mount 23 is further illustrated in FIGS. 2 and 3 of the drawings and will now be described as to the construction and manner of operation thereof. The tool mount 23 is disclosed in greater detail and is claimed in copending application Serial No. 845,376 filed October 9, 1959 now United States Patent No. 3,056,320.

The tool mount 23 comprises a base 45, which is here shown in the form of a mounting plate 46 having a reaction block 47 fixed thereon, and a yoke member 48 having the cutting tool 22 detachably secured thereto by connecting screws 49. The cutting tool 22 is actuatable with a controlled movement, in a direction toward and away from the workpiece 20 as represented by the directional arrow 50, in response to a flexing of the yoke member 48 relative to the reaction block 47. The tool mount 23 also comprises the above-mentioned power output device 31, in this case, a hydraulic pressure responsive device having valve means 52 actuatable by a signal-responsive electromagnet 53.

The yoke member 48 comprises a pair of spaced flexible arms 54 and 55 which are secured at one end thereof to the reaction block 47 in a straddling relation thereto, as by means of connecting screws 56, and at the other end thereof are integrally connected with a tool mount portion 57 on which the cutting tool 22 is secured. The reaction block 47 is secured to the base plate 46 by connecting screws 58 and is of an elongated shape so as to extend into and along the space 59 between the arms 54 and 55 of the yoke member 48. The tool mount portion 57 and the cutting tool 22 attached thereto have a limited control movement in opposite directions as indicated by the arrow 50 and produced by the double-acting functioning of the hydraulic pressure responsive power device 30 in flexing the arms 54 and 55.

The tool mount portion 57 of the yoke member 48 is suitably supported in a spaced relation to the base plate 46 for this limited control movement, as by means of a pair of transversely flexible mounting studs 60 and 61. The studs 61 have their lower ends secured to the base plate 46, as by threaded connections 63, and extend upwardly into clearance bores 62 provided in the tool mount portion 57. The upper ends of the mounting studs 60 and 61 are provided with clamping nuts 63 by which the tool mount portion 57 is secured to such upper ends.

The hydraulic pressure responsive power device 30 comprises a pair of cylinder chambers 65 and 66 formed in the inner end portion 47ª of the reaction block 47, and a pair of pistons 67 and 68 operable in such cylinder chambers. The pistons 67 and 68 are effective against the flexible arms 54 and 55 of the yoke member 48 through interposed disk-shaped thrust members 69 and 70 having mounting stems 71 and 72 extending through the flexible arms and to which clamping nuts 73 have been applied. Suitable passage means 74 formed in the reaction block 47 connects the valve means 52 with the cylinder chambers 65 and 66 for supplying the hydraulic pressure fluid to, and exhausting the same from, such cylinder chambers.

The valve means 52 is of a suitable construction and is located in the reaction block 47 in association with the passage means 74 so that actuation of a reciprocably movable inner valve member 75 in co-operation with a reciprocably shiftable valve sleeve 76 causes the hydraulic pressure fluid to be supplied to and exhausted from the cylinder chambers 65 and 66. The reciprocably movable valve member 75 and valve sleeve 76 are received in a tubular valve body 77 which is disposed in a bore 78 of the reaction block and positioned therein by cover members 80 and 81 located at the upper and lower ends of such bore. The valve member 75 includes an actuating stem 82 projecting through the cover 80 and extending adjacent the electromagnet 53.

The electromagnet 53 is mounted on an upper plate 85 which is secured to the reaction block 47 by attaching screws 86. The plate 85 is provided with a recess 88 in the underside thereof and with an opening 89 in the top wall thereof in communication with such recess to accommodate the valve actuating stem 82. The valve actuating stem 82 also extends through an opening 90 of a swingable adjusting member 91 which is located in the recess 88 and mounted on a transverse pivot pin 92.

A desired initial setting of the valve member 75 is provided by the action of a compression spring 93 disposed around the valve stem 82 and seated against one side of the swingable member 91, and an adjusting screw 94 threaded into the mounting plate 85 and engaging the swingable member on the other side thereof. The opposite end of the compression spring 93 is in engagement with a spring seat formed by a collar 95 provided on the valve stem 82.

The electromagnet 87 can be of any suitable construction and is here shown as comprising a magnet frame 98 having an energizing coil 99 thereon, and an armature 100 swingably connected with the frame by a pivot pin 101 and having a free end portion 102 engageable with the upper end of the valve stem 82 by a downward movement in response to energization of the magnet coil. The extent of movement of the armature 100 and the valve stem 82 in an upward direction by the spring 93 can be varied by means of an adjustable stop screw 103 which is adjustably movable toward and away from the armature in opposition to a compression spring 104 disposed therearound. The electromagnet 53 is preferably disposed in a housing 105 having a hollow guide part 106 into which portions of the valve stem 82 and the armature 100 project and on which the adjusting screw 103 is located.

Hydraulic fluid of a suitable pressure value is supplied to the power device 30 through a supply conduit 107 which extends to the valve means 52 through an opening in the plate 85. The supply conduit 107 is connected with an available source of such hydraulic pressure fluid located in or adjacent the machine 10, and the exhaust outlet of the valve means 52 is connected with a reservoir or the like by a return conduit 108 which also extends through an opening in the plate 85.

From the general arrangement and construction described above for the tool mount 23 it will be seen that when the electromagnet 53 is energized by control signals supplied therethrough from the reading means 35, the valve means 52 will be actuated to supply pressure fluid to one or the other of the cylinder chambers 65 and 66 depending upon the direction of actuation of the valve member 75. When pressure fluid is thus supplied to the cylinder chamber 65, the piston 67 will be moved in a direction to flex the arm 54 of the yoke member 48 to thereby impart a corresponding control movement to the cutting tool 22 for moving the same toward the workpiece 20. This actuation of the tool 22 by the piston 67 causes the tool to be placed and held in cutting engagement with the workpiece 20. When pressure fluid is supplied to the cylinder chamber 66, the piston 68 is similarly actuated but in a direction to flex the arm 55 and move the tool 22 in a direction away from the workpiece 20 to thereby interrupt the cutting of the workpiece until the piston 67 is again actuated to move the tool back into cutting engagement with the workpiece.

Figure 4:
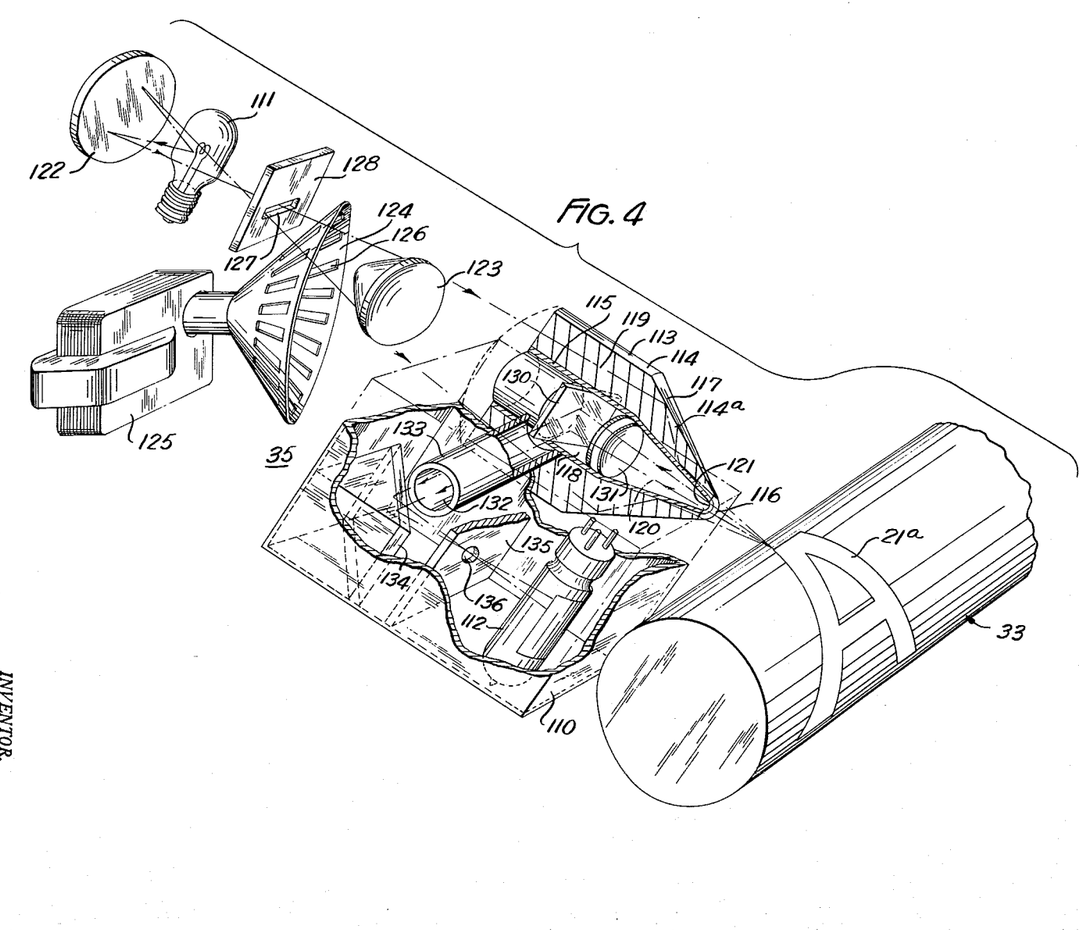
FIG. 4 is an expanded perspective view, of a diagrammatic form and with portions in section, further illustrating the photoelectric pattern reading means of the apparatus of FIG. 1 and showing the same in a co-operative relation to a rotatable pattern means.

The reading means 35 will now be described in greater detail with reference to the expanded diagrammatic view of FIG. 4. The reading means 35 comprises a suitable housing 110, a source of light located in or adjacent the housing for supplying illumination to the pattern means 33 and represented by an incandescent lamp 111, and a photoelectric cell 112 located in the housing and responsive to light reflected from the pattern means.

Light from the lamp 111 is directed against the pattern means 33 by a suitable light transmitting means 113 which is here shown as comprising coaxially disposed outer and inner transparent and opaque tubular members 114 and 115. The outer tubular member 114 is made of a suitable light-conducting plastic material and includes a cone-shaped front end portion 114ª having a hollow annular light-delivery apex 116 presented toward the pattern means. The cone-shaped portion 114ª has a convergently tapered annular surface 117 which is highly light-reflective on the inner side thereof. The opaque inner tubular member 115 has a longitudinal passage 118 therein and the wall of this member is provided on the outside and inside thereof with highly light-reflective surfaces.

The body of the outer tubular member 114 provides an annular solid conductive patth for light rays 119 moving in a direction toward the pattern means 33, and the passage 118 of the inner tubular member 115 provides a return path for light rays 120 moving in a direction away from the pattern means and entering such passage through an opening 121 of the hollow apex 116. The hollow apex 116 of the light transmitting means 113 thus forms a combined light-delivery and light-pick-up element which is disposed adjacent the pattern means 33 and projects toward the latter through a suitable opening of the housing 110.

The light rays 119 being delivered by the lamp 111 are intensified by a suitable reflector 122 disposed adjacent the lamp, and are suitably focused into the rear end of the light transmitting means 113 by an appropriate lens 123. The light rays being supplied to the pattern means 33 are preferably interrupted by a suitable chopping device for the purpose of minimizing the effects of room lights and other extraneous illumination on the pattern means 33. The chopping device provided for this purpose can be located in or adjacent the housing 110 and is here shown as comprising a rotatable shutter 124 driven by an electric motor 125 and having aperture slots 126 through which the light rays 119 pass in an interrupted relation as the shutter is rotated. The shutter 124 is located between the lamp 111 and the lens 123 and in an adjacent relation to a slot-shaped aperture 127 provided in a screen 128.

The light rays 120 returning from the pattern means 33 are directed onto a first reflector 130 by suitable lens means 131, both of the latter elements being located in the passage 118 of the inner tubular member 115. The reflector 130 extends transversely of the passage 118 in an inclined relation so as to direct the light rays 120 through a side outlet of the tubular member 115 into the passage 132 of a transverse tubular member 133 and onto a second reflector 134 by which such rays are delivered to the photoelectric cell 112. A screen 135 interposed between the second reflector 134 and the photoelectric cell 112 has an aperture 136 through which the rays 119 pass.

The photoelectric cell 112 is of a conventional form and is responsive to variations in the illumination supplied thereto as reflected light from the pattern means 33 for producing electric control signals. The electric signal output of the photoelectric cell 112 is supplied to the signal-responsive electromagnet 53 of the tool mount 23 through an electric circuit, such as the circuit means 137 shown in FIG. 5, and which includes suitable amplifier means 138 located in the unit 40 of FIG. 1 for amplifying such signals.

Figure 5:
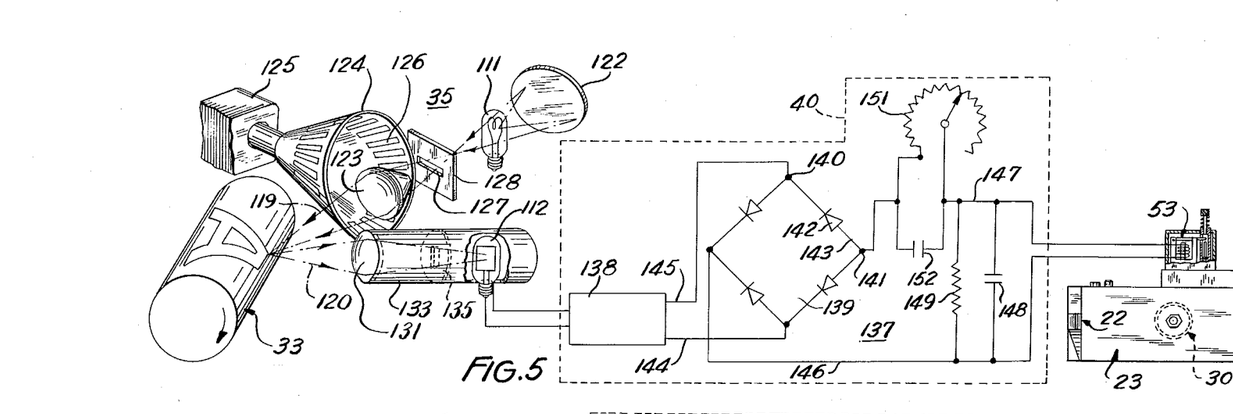
FIG. 5 is a diagrammatic view which includes a wiring diagram for illustrating the signal-responsive operative connection of the toolholders means with the photoelectric type of pattern reading means.

The amplified signals are delivered to the electromagnet 53 through a suitable rectifier 139 by which the signal output of the photoelectric cell 112 is converted to a pulsating type of rectified current. The rectifier 139 is here shown as being a bridge-type rectifier having pairs of input and output terminals 140 and 141 and rectifier cells 142 located in circuit arms 143. The input terminals 140 of the rectifier 139 are connected with the amplifier 138 by a pair of conductors 144 and 145, and output terminals 141 of the rectifier are connected with the terminals of the magnet coil 99 by a pair of conductors 146 and 147.

The circuit means 137 preferably includes a suitable condenser 148 and a suitable resistor 149, both of which are connected across the conductors 146 and 147 and provide a bypass means or filter for excluding undesirable signal components from the magnet coil 99. The circuit means 137 preferably also includes means for adjusting the same to a condition of a desired or maximum responsiveness of the electromagnet 53 to the signal output of the reading means 35. This adjusting means is here shown as comprising a rheostat-type of resistance 151 in a series relation in the conductor 147 and a condenser 152 which is likewise in a series relation in the conductor 147 and in parallel with the resistor 151.

From the functioning of the reading means 35 in producing electric control signals in response to scanning of the pattern means 33 and the operation of the power device 30 of the tool mount 23 in response to such control signals, it will be seen that the tool 22 will be moved toward and away from the workpiece 20 for producing the desired intermittent cutting engagement of the tool therewith for faithfully reproducing the configuration 21 thereon as a duplication of the pattern configuration 21a during the relative traversing movement of the tool over different portions of the workpiece.

Figure 6:
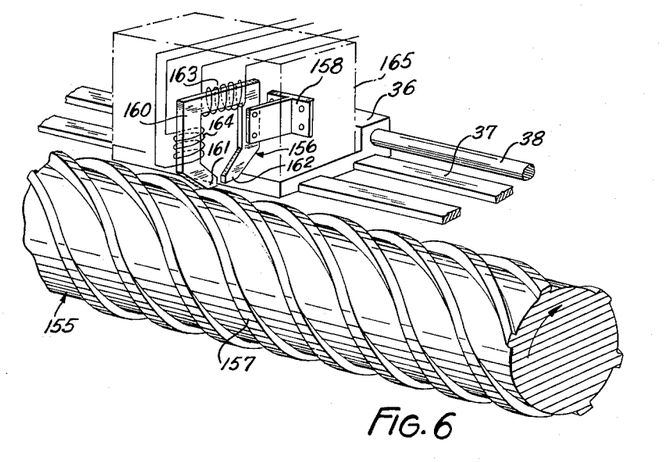
FIG. 6 is a fragmentary perspective view showing a movable pattern reading means of the electromagnetic type as an alternative form and in a co-operative relation to a rotatable pattern means.

FIG. 6 of the drawings shows a pattern means 155 and a reading means 156 of a different form and which are usable in the machine 10 of FIG. 1 in place of the pattern means 33 and the reading means 35 described above. The pattern means 155 is connected with the work spindle means 14 to be rotated thereby in synchronism with the workpiece and has helical teeth or splines 157 thereon as pattern portions of an interrupted configuration and representative of similar teeth or splines of an interrupted configuration to be reproduced on the workpiece.

The pattern reading means 156 is of the electromagnetic type and is suitably mounted on the slide 36, as by means of a bracket 158, for movement of such reading means along the pattern means 155 in the same manner as the reading means 35 of FIG. 1, that is, in synchronism with the longitudinal feed movement of the tool 22. The reading means 156 comprises a suitable magnet frame 160, which can be of the permanent magnet type if desired, and has spaced pole members 161 and 162 and a signal-producing main coil 163 on such magnet frame. The reading means 156 may, if desired, include a suitably energized bias winding 164 on the magnet frame 160 when the latter is not of the permanent magnet type.

The reading means 156 is located in a co-operative relation to the pattern means 155 so that the rotation of the latter causes the splines 157 to move past the spaced pole members 161 and 162 in succession and in a bridging relation to the air gap therebetween. This movement of the splines 157 across the air gap causes variations in the magnetic flux of the reading means 156 whereby electric control signals will be produced and delivered by the main coil 163. The bias winding 164, when provided, can be energized from a suitable current supply and results in more satisfactory signals being produced by the main coil 163. The reading means 156 is preferably located in a suitable housing 165 provided on the slide 36.

It will be observed from FIG. 6 that the reading relative movement between the pattern means 155 and the reading means 156 is produced, in part, by the rotative movement of the pattern means and, in part, by the longitudinal movement of the reading means. Since the rotative movement of the pattern means 155 and the longitudinal movement of the reading means 156 are synchronized, respectively, with the rotation of the workpiece and the longitudinal feed movement of the tool 22, it will be recognized that the control movements of the tool toward and away from the workpiece by the power device 30 of the tool mount 23 in response to the electric control signals produced by the reading means 156 will result in an interrupted cutting action on the workpiece by the tool during relative traversing movement therebetween, by which the helical splines 157 will be faithfully reproduced thereon.

Figure 7:
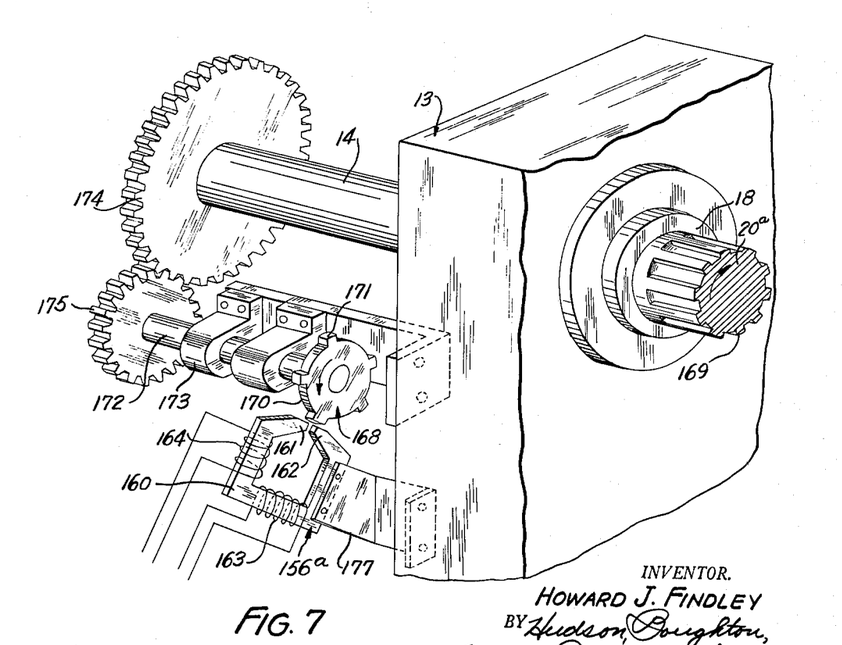
FIG. 7 is a perspective view showing a stationary pattern reading means of the electromagnetic type as another alternative form and in a co-operative relation to a rotatable pattern means.

FIG. 7 of the drawings shows an electromagnetic pattern reading means 156a similar to the above-described reading means 156 of FIG. 6 but which is a stationary reading means and co-operates with a rotatable pattern means 168. The pattern means 168 is of a form which is usable on the machine 10 when the workpiece 20a is one on which straight longitudinal teeth or splines 169 are to be formed by the tool 22.

The pattern means 168 is here shown as being a disk-like member 170 having an annular series of spaced teeth 171 on the periphery thereof. The disk member 170 is secured on a shaft 172 which is rotatably supported in bearing brackets 173 and driven in a synchronized relation to the rotation of the workpiece 20a by co-operating gear members 174 and 175. These gear members are here shown as providing a two to one gear ratio for the rotation of the pattern means 168 in relation to the rotation of the workpiece 20a. Such a two to one ratio of the gear members 174 and 175 will cause the pattern means 168 to be rotated at twice the rotative speed of the workpiece 20a, the pattern means will need to have only one-half as many teeth 171 as the workpiece is to have splines 169 cut thereon. In this case the workpiece 20a has ten splines 169, and consequently, the pattern means 168 will need to have only five of the teeth 171 as is shown in FIG. 7. By suitably varying the gear ratio between the gears 174 and 175, the workpiece 20a will be cut so that the splines 169 thereof will be helical splines instead of straight splines.

The reading means 156a is suitably supported adjacent the pattern means 168 as by means of a support bracket 177 secured to the headstock section 13. The reading means 156a is of a construction similar to the reading means 156 and when the air gap of the magnet frame 160 is spanned by the teeth 171 of the pattern means 168, electric control signals will be produced and delivered by the main coil 163. The control movements of the tool 22 toward and away from the workpiece 20a by the power device 30 of the tool mount 23 in response to these electric control signals will cause the tool to faithfully cut the desired splines 169 on the workpiece.

Figure 8:
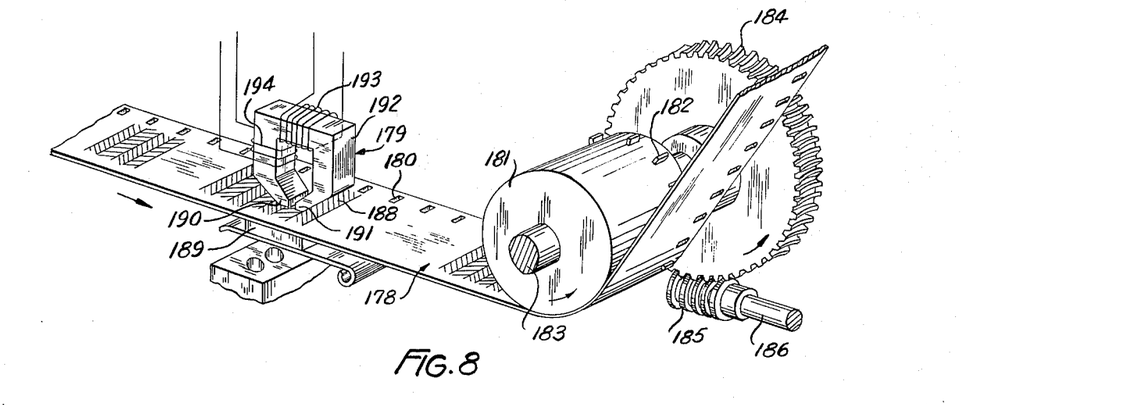
FIG. 8 is a perspective view showing a magnetic-strip form of pattern means and an electromagnetic reading means in a co-operative relation thereto.

FIG. 8 of the drawings shows a pattern means 178 and a reading means 179 usable in the machine 10 and of which the pattern means 178 is a magnetizable-strip form of pattern means such as a so-called magnetic tape. The pattern strip 178 is moved past the reading means 179 in a synchronized relation to the rotation of the workpiece 20 mounted in the workholder means 18. For this purpose, the strip 178 is provided with spaced perforations 180 along one edge thereof and passes around a driving drum 181 having sprocket teeth 182 engageable in the perforations for advancing the strip. The drum 181 is secured on a shaft 183 to which a driven gear wheel 184 is also secured thereto. The gear wheel 184 is driven by a worm gear 185 which is suitably connected with the work spindle means 14 as by shaft means 186.

The pattern strip 178 is provided with magnetized areas 188 as pattern portions and is movable over a support means 189 by which the strip is held in an adjacent relation to the spaced pole members 190 and 191 of the electromagnetic reading means 179. The reading means 179 is provided with a frame 192 which can, if desired, be of the permanent magnet type and has a main signal-producing winding 193 thereon. As the magnetized areas 188 move across pole members 190 and 191 of the frame 192 in spanning relation to the air gap therebetween, the main winding 193 will produce and deliver electric control signals. The electric control signals thus produced are supplied to, and cause, the power device 30 of the tool mount 23 to move the tool 22 in an in-and-out direction relative to the workpiece for reproducing on the latter the configuration represented by the magnetized areas 188 of the pattern strip 178. The reading means 179 may, if desired, include a suitably energized bias winding 194 when the frame 192 is not of the permanent magnet type.

Figure 9:
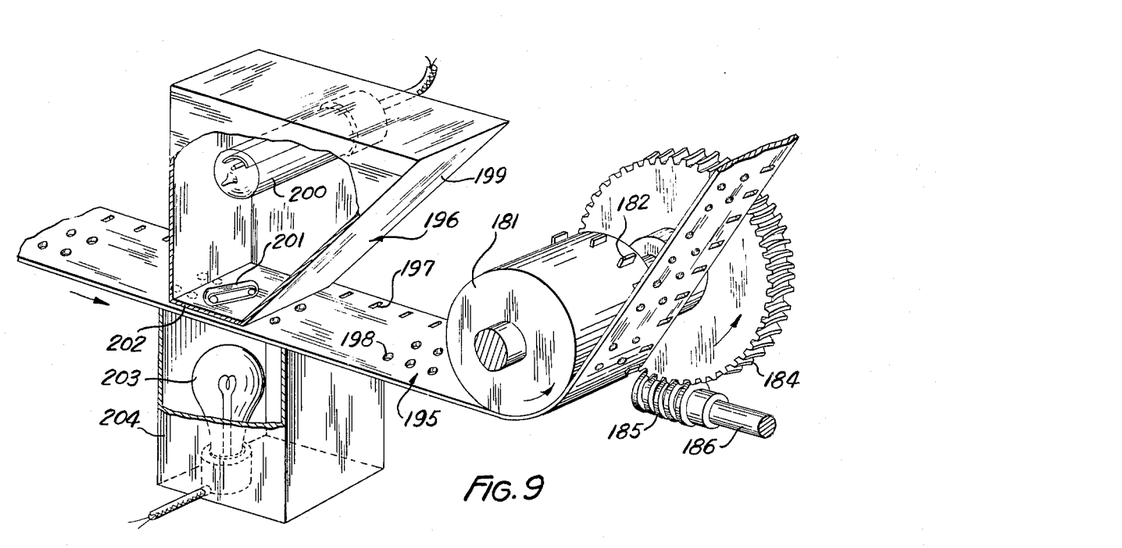
FIG. 9 is a similar perspective view showing a perforated-strip form of pattern means and a photoelectric reading means in a co-operative relation thereto.

FIG. 9 of the drawings shows a pattern means in the form of a perforated strip 195, and a photoelectric reading means 196 in a co-operative relation thereto and which pattern means and reading means are usable in the above-described machine 10.

The strip 195 may be of paper or the like having feed perforations 197 along one edge thereof and groups of control perforations 198 distributed along and across the strip. The strip 195 is advanced longitudinally in a synchronized relation to the rotation of the workpiece in the workholder means 18 in the same manner as the above-described strip 178, that is, by means of sprocket teeth 182 provided on a drum 181 which is driven from the work spindle means 14 through co-operating gear and worm gear members 184 and 185.

The reading means 196 comprises a suitably supported housing 199 and a photoelectric cell 200 located in the housing opposite an orifice 201 of an inclined-slot form provided in the bottom wall 202 of the housing. The reading means also includes a source of light such as an incandescent lamp 203 located in a lower housing 204 having a top opening across which the strip 195 extends. The lamp 203 is disposed in a position to deliver light through the orifice 201 onto the photoelectric cell 200.

As shown in FIG. 9 the photoelectric cell and the orifice 201 are located on one side of the strip 195 and the lamp 203 is located on the opposite side of the strip, so that the light delivered to the photoelectric cell will be controlled in accordance with the movement of the perforations 198 across the orifice. By providing the perforations 198 in groups so that the perforations are spaced transversely of the strip 195 as well as longitudinally thereof, the strip will be able to carry a much larger number of control perforations as pattern portions than if the perforations were disposed in a single longitudinally extending row. The use of the grouped perforations 198 in conjunction with the inclined slot orifice 201 also provides for a maintained supply of light to the photoelectric cell 200 during the movement of the perforations past the orifice.

As the strip 195 is advanced in synchronism with the rotation of the workpiece by the work spindle means 14 and the control perforations 198 are thereby moved across the orifice 201 and permit light to fall on the photoelectric cell 200, electric control signals will be produced by the photoelectric cell and will be supplied to the power device 30 of the tool mount 23. The electric control signals thus produced are supplied through the circuit means 137 of FIG. 5 to the power device 30 of the tool mount 23 which will then cause the in-and-out movements of the tool 22 relative to the workpiece and a resulting faithful reproduction on the workpiece of the desired configuration represented by the perforation 198.

Figure 10:
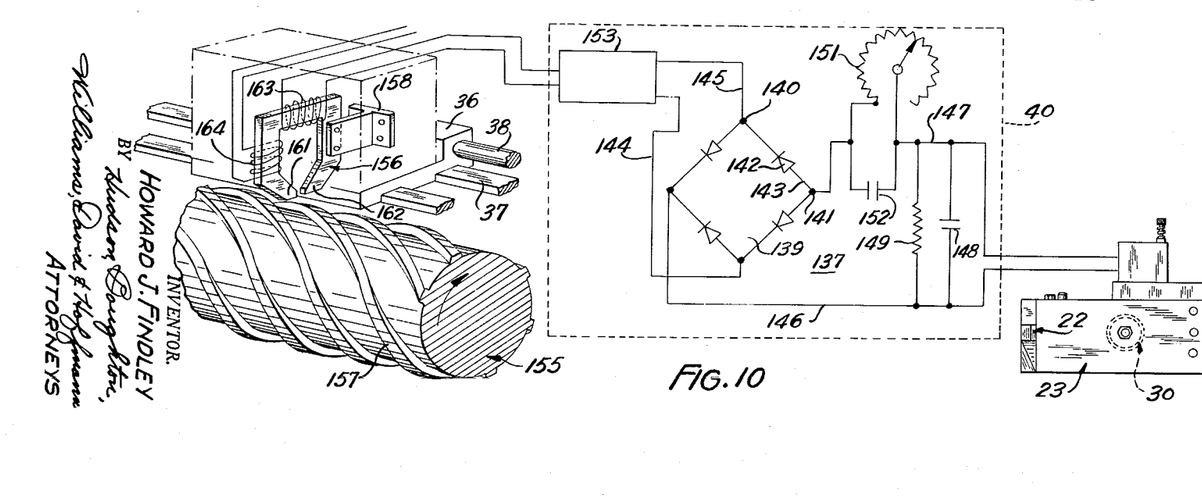
FIG. 10 is a diagrammatic view similar to that of FIG. 5 and showing the toolholder means connected in a signal-responsive relation to pattern reading means of the electromagnetic type.

FIG. 10 of the drawings shows the above-described circuit means 137 being used to connect the electromagnetic type of reading means 156 of FIG. 6 with the power device 30 of the tool mount 23. The connection of the circuit means 137 with the main winding 163 of the reading means 156 is through a suitable amplifier 153. The bias winding 164 of the reading means 156 of FIG. 10 can be supplied with energizing current from a suitable source such as a battery 205 and, when this bias winding is provided, it results in more satisfactory signals from the main winding 163. The circuit means 137 of FIG. 10 is usable in a similar manner in conjunction with the electromagnetic reading means 156ª of FIG. 7.

Figure 11:
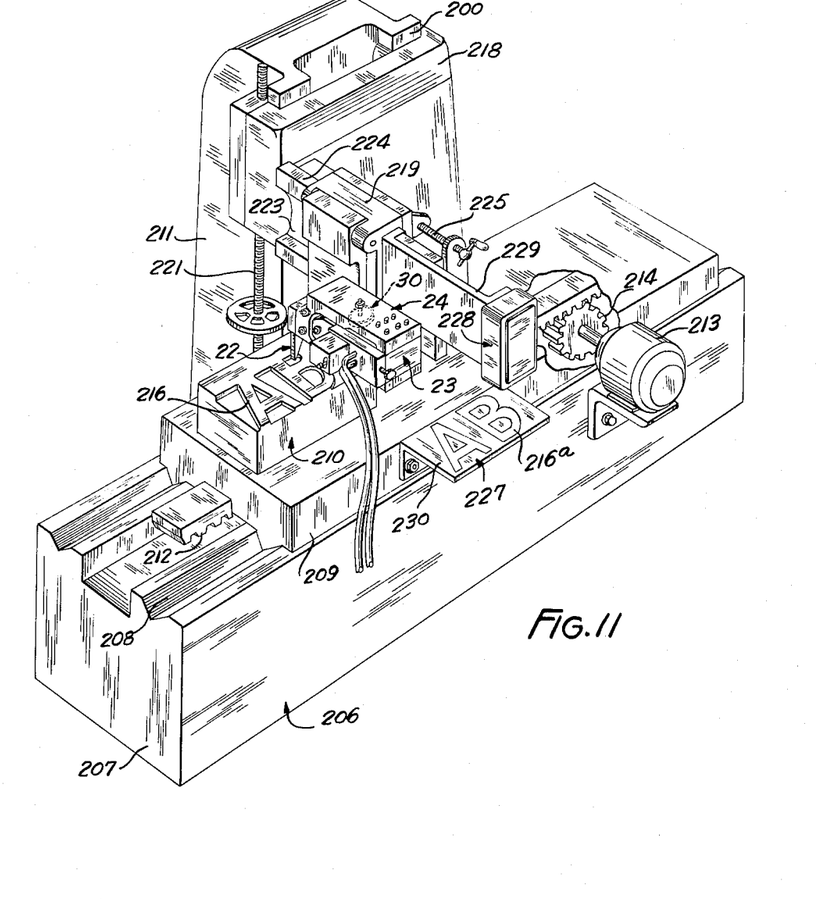
FIG. 11 is a front and top perspective view showing another form of machine tool apparatus provided by this invention and usable in the method thereof.

FIG. 11 of the drawings shows another form of apparatus usable in carrying out the novel method of this invention and which apparatus is in the form of a machine tool 206 of the planer type. The machine 206 comprises a base 207 having longitudinal ways 208 thereon, and workholder means in the form of a table 209 adapted to suport a workpiece 210 and reciprocably movable on such ways. The base 207 includes an upright rear tool support column 211 which rises thereabove. The table 209 has a rack 212 attached thereto and is moved back-and-forth along the ways 208 by a driving motor 213 having a drive pinion 214 in mesh with such rack.

The machine 206 also comprises a toolholder unit 24 of the same construction as the toolholder unit of the machine 10 and whose cutting tool 22 is movable toward and away from the workpiece 210 by a power device 30 located in the tool mount 23 for reproducing on the workpiece a desired configuration 216. The machine 206 also includes first and second movable slides 218 and 219 for supporting the workholder unit 24 and locating the same with the tool 22 thereof in the desired co-operative relation to the workpiece 210.

The first slide 218 is movable in a vertical transverse direction relative to the longitudinal feed movement of the workpiece 210 by being slidable on upright ways 220 of the column 211 and actuatable by a screw 221. The second slide 219 is supported by a laterally projecting arm 223 of the first slide 218 and is slidable on guide portions 224 of such arm, as by means of an actuating screw 225, for moving the tool 22 in a lateral transverse direction relative to the longitudinal feed movement of the workpiece 210. The toolholder unit 24 is suitably secured on a depending portion of the second slide 219.

The machine 206 is further provided with a movable pattern means 227 which is moved in synchronism with the feed movement of the workpiece 210, and a reading means 228 cooperable with the pattern means and mounted on a support bracket 229 projecting laterally from the second slide 219. The pattern means 227 comprises a suitable pattern support means, such as the bracket 230 attached to the table 209, and a configuration 216 formed of different pattern portions and representative of the interrupted configuration 216 to be reproduced on the workpiece 210 by the tool 22. The reading means 228 is preferably a photoelectric type of reading means similar to the above-described reading means 35 of FIGS. 1 and 4.

When the tool 22 is moved into the desired co-operative relation to the workpiece 210 by shifting of the first and second slides 218 and 219 by means of the screws 221 and 225, the reading means 228 will be simultaneously moved into a proper position for reading co-operation with the pattern means 227. As different portions of the workpiece 210 are moved under, and thereby traversed by, the cutting tool 22 by the longitudinal feed movement of the table 209, different pattern portions of the pattern configuration 216ᵃ will be moved in synchronism with such feed movement of the table and beneath the reading means 228. The reading means 228 operates to produce electric control signals in response to a photoelectric scanning of the pattern means 227 and to supply such signals to the power device 30 of the toolholder mount 23. It will accordingly be seen that during the operation of the machine 206 the tool 22 will be intermittently moved into and out of cutting engagement with the workpiece 216 by movement toward and away therefrom in response to the control signals and during the relative traversing movement therebetween for faithfully reproducing the configuration 216 on the workpiece.

From the accompanying drawings and the foregoing detailed description it will now be readily understood that this invention provides a novel method and apparatus for removing material from a workpiece by a cutting tool having an interrupted cutting action thereon during a substantially continuous relative traversing movement therebetween, and which interrupted cutting action is in response to a power actuated control movement of the tool toward and away from the workpiece and results in a desired interrupted configuration being faithfully reproduced on the workpiece. As disclosed herein, the interrupted cutting action is obtainable in accordance with the reading of a pattern means in synchronization with the relative traversing movement of the tool over the workpiece. It will also be seen that by the use of the method and apparatus of this invention workpieces having various desired configurations can be rapidly and economically machined with a minimum amount of attention needed by the machine operator. It will be seen furthermore that, since the control movements of the tool are produced by a power device located in the tool mount and responsive to electric control signals, the co-operation of the tool with the workpiece will have a desired high degree of accuracy and will be carried out in an instantaneous manner in accordance with the synchronized reading of the pattern means so that the cutting of the workpiece can be carried out as a high-speed machine tool operation.

Although the method and apparatus of this invention have been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. In apparatus for removing material from a workpiece at spaced apart locations to produce a desired interrupted configuration thereon; workholder means adapted to hold the workpiece; toolholder means comprising a tool mount and a cutting tool supported thereby and having control movement relative thereto, said tool mount comprising a reaction means and flexible yoke means connected with said reaction means and supporting said tool for said control movement; means actuatable to produce a substantially continuous relative traversing movement between the workpiece and tool for causing the latter to travel over different workpiece portions in succession including said spaced apart locations; pattern means having different pattern portions representative of said desired interrupted configuration; control signal producing pattern-reading means in a co-operative relation to said pattern means and operable to produce control signals; means actuatable to produce a substantially continuous reading relative movement between said reading means and pattern means in synchronism with said relative traversing movement; signal-responsive power output means on said tool mount and effective on said yoke means in response to said signals to engage said tool with and disengage the same from said workpiece by such control movement of the tool toward and away therefrom so that the cutting action of the tool on the workpiece along the path of said traversing movement is an interrupted cutting action with the cutting taking place only at said spaced apart locations; and power medium supply means connected with said power output means.

2. Apparatus as defined in claim 1 wherein said reading means comprises means operable to produce electric control signals, and said power output means comprises an electric signal responsive power output means.

3. Apparatus as defined in claim 1 wherein said reading means comprises means operable to produce electric control signals, and said power output means comprises an electrohydraulic power output means responsive to said electric control signals and including a hydraulic pressure actutatable device; said power medium supply means comprising a supply means for hydraulic pressure fluid.

4. Apparatus as defined in claim 1 wherein said reading means comprises photoelectric means operable to produce electric control signals in response to the reading of said pattern portions; and wherein said signal-responsive power output means is responsive to said electric control signals.

5. Apparatus as defined in claim 1 wherein said reading means comprises an electric signal producing means, and said power output means comprises an electrohydraulic double-acting hydraulic pressure responsive device operable to deliver power alternately in opposite directions; the delivery of power by said device in one direction being effective on said yoke means to produce said movement of the tool toward said workpiece, and the delivery of power by said device in the other direction being effective on said yoke means to produce said movement of the tool away from the workpiece.

6. Apparatus as defined in claim 1 wherein said reading means comprises an electric signal producing means, and said power output means comprises a hydraulic pressure responsive device effective on said yoke means to cause movements of said tool toward and away from the workpiece; valve means controlling said hydraulic pressure responsive device; and electric valve-actuating means operably connected with said valve means and responsive to the signals from said reading means.

7. In apparatus for removing material from a rotating workpiece at spaced apart locations to produce a desired interrupted configuration thereon; rotatable workholder means adapted to hold the workpiece; toolholder means comprising a tool mount and a cutting tool having a limited control movement relative thereto, said tool mount comprising a reaction means and flexible yoke means connected with said reaction means and supporting said tool for said control movement; workholder actuating means for rotating the workpiece relative to the tool to cause a substantially continuous relative circumferential traversing movement of the tool over different portions of the workpiece in succession including said spaced apart locations; movable carriage means supporting said toolholder means and operable to produce a feed movement of the tool relative to the workpiece during the rotation of the latter; pattern means having different pattern portions representative of said configuration; signal-producing pattern-reading means in a co-operative relation to said pattern means and operable to produce control signals in response to reading of said pattern portions; means operable to produce a reading relative movement between said reading means and pattern means in synchronism with said circumferential traversing movement; signal-responsive power output means connected between said yoke means and said reaction means of said tool mount and effective in response to said signals to engage said tool with and disengage the same from said workpiece by control movement of the tool toward and away therefrom so that the cutting action of the tool on the workpiece along the path of said traversing movement is an interrupted cutting action with the cutting taking place only at said spaced apart locations; and power medium supply means connected with said power output means.

8. Apparatus as defined in claim 7 wherein said reading means comprises photoelectric means operable to produce electric control signals in response to the reading of said pattern portions; and wherein said signal-responsive power output means is responsive to said electric control signals.

9. Apparatus as defined in claim 7 wherein said reading means comprises electromagnet means operable to produce electric control signals in response to the reading of said pattern portions; and wherein said signal-responsive power output means is responsive to said electric control signals.

10. Apparatus as defined in claim 7 wherein said pattern means is a rotatable member and said pattern portions comprise teeth on said rotatable member; and wherein said reading means comprises electromagnet means operable to produce electric control signals in response to movement of said teeth past said electromagnet means, and said signal-responsive power output means is responsive to said electric control signals.

11. Apparatus as defined in claim 7 wherein said pattern means comprises strip means having pattern portions distributed therealong and movable past said reading means by a longitudinal movement of said strip means.

12. Apparatus as defined in claim 7 wherein said pattern means comprises a longitudinally movable strip means having perforate and imperforate pattern portions, and said reading means is a photoelectric means comprising a light source on one side of the strip means and a light-sensitive electric signal producing means on the other side of said strip means; said power output means being responsive to the electric signals from said light-sensitive means.

13. Apparatus as defined in claim 12 wherein the perforate portions of the strip means have perforations distributed both longitudinally and transversely of said strip means.

14. Apparatus as defined in claim 7 wherein said pattern means is a longitudinally movable strip means and said pattern portions comprise magnetized areas on said strip means; and wherein said reading means comprises electromagnet means responsive to the flux of said magnetized areas and operable to produce electric control signals; said signal-responsive power output means being responsive to said electric control signals.

15. In apparatus for removing material from a turning workpiece at different circumferential and axial spaced locations to produce a designed interrupted configuration thereon; rotatable workholder means adapted to hold the workpiece; toolholder means comprising a tool mount and a cutting tool supported thereby and having a limited control movement relative thereto, said tool mount comprising a reaction means and flexible yoke means connected with said reaction means and supporting said tool for said control movement; workholder actuating means for rotating the workpiece relative to the tool to cause a substantially continuous relative circumferential traversing movement of the latter over different portions of the workpiece in succession including said different circumferential and axial spaced locations; movable carriage means supporting said toolholder means and operable to produce a feed movement of the tool relative to the workpiece during the rotation of the latter; means operable to support a pattern means having different pattern portions representative of said configuration and to rotate said pattern means in synchronism with the rotation of the workpiece; signal-producing pattern reading means in a co-operative relation to said pattern means and operable to produce control signals in response to reading of said pattern portions; signal-responsive power output means connected between said yoke means and said reaction means of said tool mount and effective in response to said signals to engage said tool with and disengage the same from said workpiece by control movement of the tool toward and away therefrom so that the cutting action of the tool on the workpiece along the path of said traversing movement is an interrupted cutting action with the cutting taking place only at said different circumferential and axial spaced locations; and power medium supply means connected with said power output means.

16. Apparatus as defined in claim 15 wherein said feed movement of the tool is a longitudinal feed movement along the workpiece, and said reading means is movable; and means operable to move said reading means in synchronism with said longitudinal feed movement of said tool.

17. Apparatus as defined in claim 15 wherein said reading means comprises photoelectric means operable to produce electric control signals in response to the reading of said pattern portions; and wherein said signal-responsive power output means is responsive to said electric control signals.

18. In apparatus for removing material from a workpiece at spaced apart locations to produce a desired interrupted configuration thereon; a reciprocably movable workholder adapted to receive a workpiece thereon; toolholder means comprising a tool mount and a cutting tool having a limited control movement relative thereto, said tool mount comprising a reaction means and flexible yoke means connected with said reaction means and supporting said tool for said control movement; workholder drive means operable to produce a longitudinal work-stroke movement of the workpiece for causing different portions of said workpiece including said spaced locations to be traversed by the tool along a longitudinal tool excursion path; means operable to support a pattern means having different pattern portions representative of machining desired on the different workpiece portions, and to move said pattern means logitudinally in synchronism with said work-stroke movement of the workpiece; movable carriage means supporting said toolholder means and operable to produce feed movement of the tool relative to the workpiece in a direction transverse to said work-stroke movement; signal-producing pattern reading means co-operable with said pattern portions for producing control signals in response to reading thereof; means connected with said carriage means and supporting said reading means for movement in a direction transverse to said work-stroke movement and in synchronism with said feed movement of the tool; signal-responsive power output means connected between said yoke means and said reaction means of said tool mount and effective in response to said signals to engage said tool with and disengage the same from said workpiece by control movement of the tool toward and away therefrom so that the cutting action of the tool on the workpiece along said excursion path is an interrupted cutting action with the cutting taking place only at said spaced apart locations; and power medium supply means connected with said power output means.

19. An apparatus for removing material from a turning workpiece at different circumferential and axially extending spaced portions to produce a desired grooved interrupted configuration thereon; rotatable workholder means adapted to hold the workpiece; toolholder means comprising a tool mount and a cutting tool supported thereby and having a limited control movement relative thereto, said tool mount comprising a reaction means mounted on said tool mount and flexible yoke means connected with said reaction means and supporting said tool for said control movement; workholder actuating means for rotating the workpiece relative to the tool to cause a substantially continuous relative circumferential traversing movement of the latter over different portions of the workpiece in succession including said spaced locations; movable carriage means supporting said toolholder means and operable to produce a longitudinal feed movement of the tool relative to the workpiece during the rotation of the latter; means operable to support a pattern means having different pattern portions representative of said grooved configuration and to rotate said pattern means in synchronism with the rotation of the workpiece; signal producing pattern reading means in a cooperative relation to said pattern means operable to produce electric control signals in response to reading of said pattern portions; means for moving said pattern reading means in synchronism with said longitudinal feed movement of the tool; electric signal responsive power output means connected between said yoke means and said reaction means of said tool mount and effective in response to said signal to engage said tool with and disengage said tool from said workpiece by controlled movement of the tool toward and away therefrom so that the cutting action of the tool on the workpiece along the path of said traversing movement is an interrupted cutting action with the cutting taking place only at said spaced grooved locations; and power medium supply means connected with said power output means.

20. In apparatus for removing material from a workpiece at spaced locations to produce a desired interrupted configuration thereon; workholder means adapted to hold the workpiece; toolholder means comprising a tool mount and a cutting tool supported thereby, said tool mount comprising a reaction means mounted on said tool mount and flexible yoke means connected with said reaction means and supporting said tool for said control movement; signal responsive power output means connected between said yoke means and said reaction means of said tool mount for moving said tool between a predetermined cutting position and a predetermined retracted position; means actuatable to produce a substantially continuous relative traversing movement between the workpiece and tool for causing the latter to travel over different workpiece portions in succession including said spaced locations; pattern means having image and non-image surfaces representative of said desired configuration; pattern reading means in a co-operative relation to said pattern means and operable to produce a first control signal when reading an image surface and a second control signal when reading a non-image surface; means actuatable to produce a substantially continuous reading relative movement between said reading means and pattern means in synchronism with said relative traversing movement; said signal-responsive power output means on said tool mount being effective in response to said first control signal to move said tool to the retracted position and being effective in response to said second control signal to move said tool to the cutting position so that the cutting action of the tool on the workpiece along the path of said traversing movement is an interrupted cutting action with the cutting taking place only when reading said non-image surfaces; and power medium supply means connected with said power output means.

21. The apparatus according to claim 20 wherein said reading means comprises photoelectric means operable to produce a first electric control signal in response to the reading of said image surface and a second electric control signal in response to the reading of said non-image surface; and wherein said signal-responsive power output means is responsive to said electric control signals.

22. The apparatus according to claim 21 wherein said photoelectric reading means includes a chopping device for minimizing the effects of ambient light on the pattern means.

References Cited by the Examiner

UNITED STATES PATENTS

| 1,695,617 | 12/28 | Teissere | 82—14 XR |
| 1,914,258 | 6/33 | Howey | 82—14.2 XR |
| 2,044,497 | 6/36 | Schiltz | 82—1.4 |
| 2,085,127 | 6/37 | Sparkes | 82—14.2 XR |
| 2,125,074 | 7/38 | Long | 82—14.2 |
| 2,127,523 | 8/38 | Kraus | 82—1.4 |
| 2,373,265 | 4/45 | Salisbury | 82—14.2 |
| 2,632,353 | 3/53 | Montanus et al. | 82—14.2 |
| 2,720,129 | 10/55 | De Haas et al. | 82—21.1 XR |
| 2,736,144 | 2/56 | Thatcher | 51—64 |

ANDREW R. JUHASZ, *Primary Examiner.*

LEON PEAR, *Examiner.*